United States Patent
Martinek et al.

(10) Patent No.: US 6,368,031 B1
(45) Date of Patent: Apr. 9, 2002

(54) AXIAL FEED APPARATUS HAVING AN ADJUSTABLE FEED STOP AND ASSOCIATED METHOD

(75) Inventors: Brian J. Martinek, Troy; James L. Morrison, O'Fallon; David L. Fritsche, Toristell; Thomas O. Blankenship, St. Charles; Daniel C. King, Ballwin, all of MO (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/525,353

(22) Filed: Mar. 15, 2000

(51) Int. Cl.[7] .......................... B23B 35/00; B23B 45/00
(52) U.S. Cl. ..................... 408/1 R; 408/14; 408/130; 408/241 S
(58) Field of Search .................... 408/1 R, 14, 130, 408/241 S

(56) References Cited

U.S. PATENT DOCUMENTS

| | | | |
|---|---|---|---|
| 2,110,537 A | * 3/1938 | Tautz | 408/241 S |
| 2,957,374 A | * 10/1960 | Djidich et al. | 408/130 |
| 3,318,391 A | * 5/1967 | Linsker | 408/130 |
| 3,663,138 A | * 5/1972 | Petroff | 408/130 |
| 4,435,109 A | 3/1984 | Wilder | |
| 4,443,139 A | 4/1984 | Eash | |
| 4,588,334 A | * 5/1986 | Khurana | 408/97 |
| 4,764,060 A | * 8/1988 | Khurana | 408/14 |
| 4,961,675 A | 10/1990 | Stewart | |
| 5,073,068 A | 12/1991 | Jinkins et al. | |
| 5,096,342 A | * 3/1992 | Blankenship et al. | 408/241 S |

* cited by examiner

Primary Examiner—Daniel W. Howell
(74) Attorney, Agent, or Firm—Alston & Bird LLP

(57) ABSTRACT

An axial feed apparatus having an adjustable feed stop is provided. The axial feed apparatus generally comprises a power feed module having an adjustable stop mechanism engaged therewith, wherein the adjustable stop mechanism may comprise a spindle threadedly engaging the power feed module. An adjustable depth-controlling device is further included intermediate the spindle and the power feed module, which uses a series of calibrated graduations in communication with the spindle such that a rotational change in the engagement of the graduations moves the spindle by a predetermined axial distance and thereby adjust the position of the feed stop for the power feed module. Such a power feed module may be combined with a drill motor to produce a device capable of drilling/countersinking holes in a workpiece. A drilling/countersinking device is thus facilitated that is capable of providing a readily adjustable feed stop for positively controlling the depth of the drilled/countersunk hole in a consistent, accurate, and repeatable manner. An associated method is also provided.

29 Claims, 4 Drawing Sheets

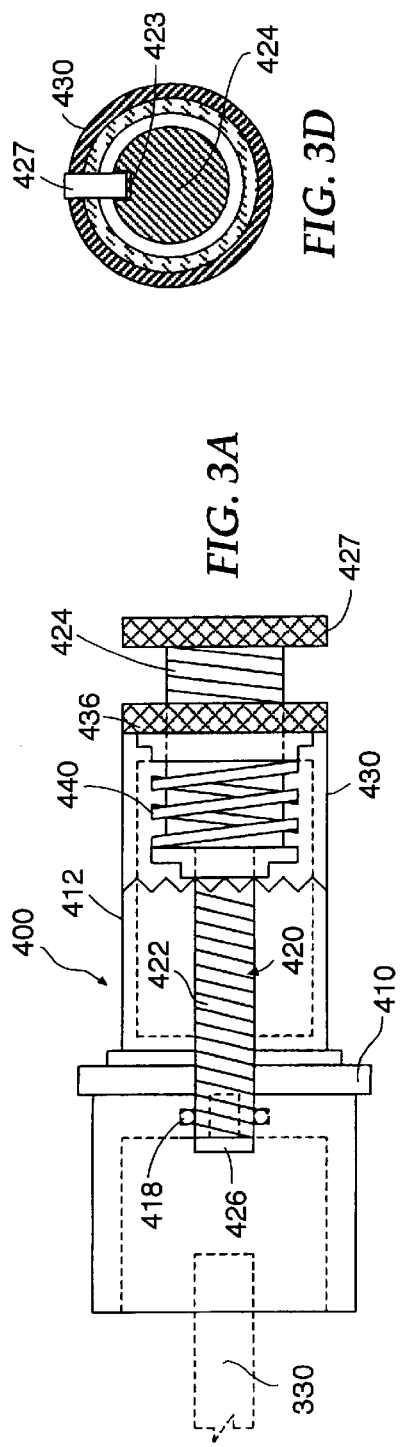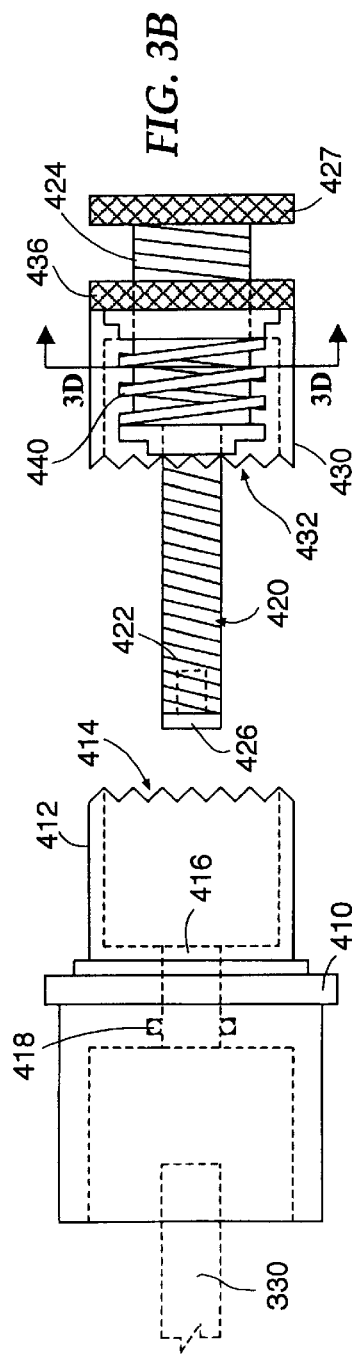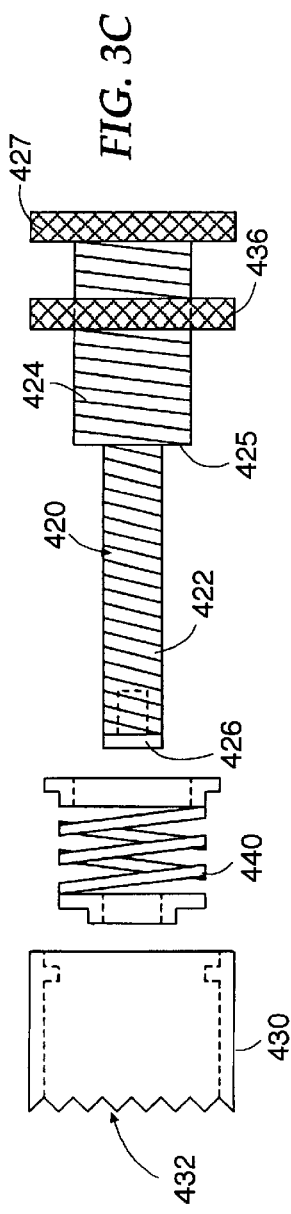

AXIAL FEED APPARATUS HAVING AN ADJUSTABLE FEED STOP AND ASSOCIATED METHOD

FIELD OF THE INVENTION

The present invention relates to drilling apparatuses and, more particularly, to an axial feed apparatus having an adjustable feed stop and associated method.

BACKGROUND OF THE INVENTION

The production of components of an assembly, for example, airplane structural components, often requires that holes be drilled in the components to accommodate the fasteners that secure the assembly together. In some instances, the drilled holes may also need to be countersunk. Typically, the countersink has a preferred depth where the diameter of the countersink is matched to the fastener being used. If the countersink is not deep enough, the fastener may protrude outwardly of the component surface. If the countersink is too deep, particularly in a thin-section component, the hole associated with the countersink may be unacceptably large, the structural strength of the component may be adversely affected, and the fastener may not be able to securely fasten the component. In addition, the excess countersink depth, after the fastener has been installed, will define a cavity which may undesirably collect debris or disrupt airflow about the component. Further, since these components are generally fabricated in a manufacturing operation, where multiple holes must be drilled and countersunk in one or more components, consistency of the countersink depth is also typically required. In some instances, it is also desirable that a drill/countersink operation be performed in a single pass of the drilling/countersinking device in order to reduce the time and additional costs associated with rework or multi-pass procedures.

Drilling and countersinking are related processes which may be accomplished using two or more separate cutters or a single cutter capable of performing both functions. However, the countersinking operation is often the most sensitive to the depth of the cut than the drilling operation. Thus, the term "countersinking" will be used herein for the sake of simplicity, but it is understood that any description of a countersinking operation is equally applicable to a drilling operation.

In some manufacturing operations, countersinking processes are manually performed using a handheld drill motor. Where the operation includes a countersinking process, a mechanism for controlling the depth of the countersink may be secured in the chuck of the drill motor, to the drill motor, or to the cutter itself. However, a manual countersinking operation may be unacceptable for some manufacturing operations due to inconsistency caused by the operator(s). In addition, the depth control mechanism may require frequent adjustments to maintain a consistent countersink, particularly in the event that, for example, the cutter is changed or adjusted or a different drill motor is used for the process. Thus, there exists a need for a countersinking device capable of operating automatically with minimal operator involvement. In addition, there exists a need for a device capable of consistently, accurately and repeatably controlling the depth of a countersink. Such a device should require minimal adjustments to obtain and/or maintain the desired countersink depth, even if the cutter is changed or a different drill motor is used for the operation.

In some situations, countersinking processes may be performed with, for example, pneumatic power feed equipment, wherein a pneumatic drill motor is used to turn a cutter while an integral feed mechanism feeds and retracts the cutter over a predetermined distance. The relative positioning of the component or workpiece with respect to the travel of the cutter generally determines the depth of the countersink. In practice, the depth of the countersink may be controlled by a mechanism interacting with the chuck, the cutter, and/or the drill motor. However, such a device, much like the manual drill motor previously described, may require frequent adjustments to maintain a consistent countersink, particularly in the event that, for example, the cutter is changed or adjusted or a different drill motor is used for the process. In some instances, adjusting the device may be a complicated procedure requiring at least partial disassembly of the countersinking apparatus.

Alternatively, a dead stop may be used in conjunction with the feed mechanism, wherein the dead stop stops the feed mechanism, and thus the cutter, at a predetermined limit. However, the feed mechanism may not necessarily be aligned with or securely fixed to the drill motor, thereby possibly causing unacceptable deviations from the desired countersink depth since the feed mechanism may not be able to sense and/or respond to the actual forces experienced by the cutter. Further, the feed mechanism may form an integral assembly with the drill motor, thereby limiting the applicability of depth control mechanism if, for example, a different drill motor must be used for the operation due to size or accessibility constraints in the countersinking process. Thus, there exists a further need for a device capable of consistently, accurately and repeatably controlling the depth of a countersink cutter that is driven by a drill motor and fed by pneumatic power feed equipment. Such a device should be in communication with the cutter such that the position of the cutter and/or the forces experienced by the cutter can be included in the determination of the desired countersink depth. The device should also be able to obtain and/or maintain the desired countersink depth if the cutter is changed or a different drill motor is used for the operation and preferably accomplishes this consistency without requiring excessive and/or complicated adjustments.

Thus, there exists a need for pneumatic power feed equipment, particularly equipment used in countersinking processes in a manufacturing operation, having a device capable of consistently, accurately and repeatably controlling the depth of the countersink. Such a device should also be able to obtain and/or maintain the desired countersink depth, even if the cutter is changed or a different drill motor is used for the operation, and preferably accomplishes this consistency without requiring excessive and/or complicated adjustment. The device should also be in communication with the cutter such that the position of the cutter and/or the forces experienced by the cutter can be included in the determination of the desired countersink depth.

SUMMARY OF THE INVENTION

The above and other needs are met by the present invention which, in one embodiment, provides an axial feed apparatus having an adjustable feed stop. The apparatus generally comprises a hydraulically-actuated device, a sleeve, a spindle, and a collar. The hydraulically-actuated device comprises a feed member slidably disposed within a housing. The sleeve has a first end engaging the housing and a second end extending outwardly therefrom, wherein the second end defines a series of graduations thereabout. The spindle has a feed stop extending into the housing through the sleeve such that the feed stop is capable of engaging the feed member and providing a feed limit. The collar surrounds the spindle outwardly of the housing and is rotationally fixed with respect to the spindle. The collar further defines a series of graduations thereabout corresponding to, and engageable with, the sleeve graduations. The spindle is thereby prevented from rotating when the collar graduations engage the sleeve graduations. The collar is firther slidably engaged with the spindle to allow disengagement of the graduations and rotation of the spindle. Preferably, the graduations and the spindle are configured such that a rotational change of the collar graduations with respect to the sleeve graduations moves the feed stop by a corresponding axial distance.

In some instances, the hydraulically-actuated device comprises a pneumatic drill motor having a power feed module and, in other instances, a hydraulic power feed module. The apparatus may further comprise a mechanical bias member operably connected between the spindle and the collar in order to bias the collar graduations toward the sleeve graduations, wherein the mechanical bias member may comprise, for instance, a coil spring. In addition, the sleeve and the spindle are threadedly engaged. Accordingly, the graduations and the spindle are configured such that a rotational change of the collar graduations with respect to the sleeve graduations results in an axial movement of the spindle with respect to the sleeve and may correspond to moving the feed stop at a rate of, for example, no more than 0.001 inches/graduation. The apparatus may further comprise a jam nut engaging the spindle and configured to selectively retain the collar graduations in engagement with the sleeve graduations. Where the spindle engages the hydraulically-actuated device, a sealing member may further be provided to form a seal between the spindle and the housing, wherein the sealing member may comprise an o-ring disposed about the orifice and configured to sealingly engage the spindle. Preferably, the spindle is uniaxially disposed with respect to the feed member to provide a positive stop.

Another advantageous aspect of the present invention comprises an axial feed drilling apparatus having an adjustable feed stop. Generally, the apparatus comprises an axial feed device and a drill motor adapted to rotate a cutter. The axial feed device has a feed member adapted to feed the cutter, wherein the feed member is moveable toward a feed stop disposed uniaxially with respect thereto. The axial feed device further has first and second members with respective graduations that are capable of interacting, such that a change in engagement between the interacting first and second graduated members moves the feed stop by a predetermined axial distance. The axial feed device thereby provides an adjustable feed limit where the feed member engages the feed stop. In some instances, the apparatus further comprises a retraction mechanism for retracting the feed member from the feed limit.

In some embodiments, the axial feed device may be hydraulically actuated and may further comprise a housing having a feed member slidably disposed therein, a sleeve, a spindle, and a collar. The sleeve comprises the first graduated member, which has a first end engaging the housing and a second end extending outwardly of the housing, wherein the second end defines a series of graduations thereabout. The spindle threadedly engages the sleeve and has an end comprising the feed stop. The feed stop extends into the housing such that the feed stop is capable of engaging the feed member. The collar comprises the second graduated member and surrounds the spindle outwardly of the housing. In addition, the collar is rotationally fixed with respect to the spindle and defines a series of graduations thereabout corresponding to, and engageable with, the sleeve graduations. In this manner, the spindle is prevented from rotating when the collar graduations engage the sleeve graduations. Preferably, the collar slidably engages the spindle to allow disengagement of the graduations and therefore rotation of the spindle. The graduations and the spindle are configured such that a rotational change of the collar graduations with respect to the sleeve graduations moves the feed stop by a corresponding axial distance. The apparatus may further comprise a jam nut engaging the spindle and configured so as to selectively retain the collar graduations in engagement with the sleeve graduations. Still further, the apparatus may comprise a mechanical bias member such as, for example, a coil spring, operably connected between the spindle and the collar to bias the collar graduations towards the sleeve graduations. Generally, the graduations and the spindle are configured such that a rotational change of the collar graduations with respect to the sleeve graduations corresponds to an axial movement of the feed stop of, for example, no more than 0.001 inches/graduation.

Still a further advantageous aspect of the present invention comprises an axial feed drilling apparatus having an adjustable feed stop. Generally, the apparatus comprises a pneumatic drill motor adapted to rotate a cutter, a power feed module, and a stop device. The power feed module has a moveable feed member adapted to feed the cutter, while the stop device is disposed uniaxially with respect to the feed member and has a feed stop. The stop device also has first and second members with respective graduations that are capable of interacting such that a change in engagement between the interacting first and second graduated members moves the feed stop by a predetermined axial distance, the stop device thereby providing an adjustable feed limit where the feed member engages the feed stop.

The stop device may further comprise a sleeve and a collar. The sleeve comprises the first graduated member and has an end defining a series of graduations thereabout, wherein the sleeve is further configured to threadedly engage the feed stop. A collar comprises the second graduated member and surrounds the feed stop outwardly of the sleeve, wherein the collar is rotational fixed with respect to the feed stop and defines a series of graduations thereabout corresponding to, and engageable with, the sleeve graduations. Accordingly, the feed stop is prevented from rotating when the collar graduations engage the sleeve graduations. The collar is also slidably engaged with the feed stop to allow disengagement of the graduations and rotation of the feed stop, wherein the graduations and the feed stop are configured such that a rotational change of the collar graduations with respect to the sleeve graduations moves the feed stop by a corresponding axial distance.

Still another advantageous aspect of the present invention comprises a method of controlling the axial feed of a drilling apparatus. First, a drill motor is engaged with a feed member of an axial feed device, wherein the drill motor is adapted to rotate a cutter. A feed stop on the axial feed device is then adjusted. The axial feed device generally comprises first and second members with respective graduations that are capable of interacting. Accordingly, adjusting the feed stop further comprises changing the engagement of the graduations of the first and second members to axially move the feed stop by a predetermined amount. The feed member is then moved into engagement with the feed stop to thereby feed the cutter to an adjustable feed limit.

More particularly, adjusting the feed stop further comprises moving one member axially with respect to the other member to disengage the respective graduations, then rotating one member with respect to the other to axially move the feed stop, and then re-engaging the respective graduations to secure the feed stop at a predetermined position. In some instances, adjusting the feed stop further comprises moving one member with respect to the other to provide an axial movement of the feed stop of, for example, no more than 0.001 inches/graduation. According to some embodiments, the method may further comprise locking the feed stop by preventing disengagement of the first and second members following adjusting of the feed stop, wherein locking of the feed stop may comprise biasing one member toward the other with a mechanical biasing device such as, for example, a coil spring.

Thus, the adjustable feed stop implemented in an axial feed apparatus for a drilling device according to embodiments of the present invention is capable of consistently, accurately, and repeatedly controlling the depth of a countersink. In some instances, the axial feed apparatus with the adjustable feed stop is modular and allows different drill motors to be used therewith. In these situations, the drill motor can be relatively easily changed and the new drill motor readily adjusted to maintain consistency with previous countersinks. Such a device is also capable of being easily adjusted when necessary in response to changes in other factors such as, for example, changing of the cutter. Thus, the axial feed device having an adjustable feed stop according to embodiments of the present invention provides a mechanism for obtaining consistent countersinks in a manufacturing operation by providing an automated axial feed system having a readily adjustable feed stop. The feed stop mechanism according to embodiments of the present invention allows the feed stop to be easily and accurately adjusted even if different cutters or drill motors are used. Such a device, though requiring less frequent adjustments, does not require disassembly of the machine in order to adjust the countersink depth by a trial-and-error process. Calibrated graduations are provided which indicate the position of the feed stop and are capable of moving the feed stop by a predetermined axial distance. The adjustable feed stop according to embodiments of the present invention therefore provides a more consistent and positive control for a drilling apparatus having an axial feed device as compared to the prior art.

BRIEF DESCRIPTION OF THE DRAWINGS

Some of the advantages of the present invention having been stated, others will appear as the description proceeds, when considered in conjunction with the accompanying drawings, which are not necessarily drawn to scale, in which:

FIG. 3A is a cross-sectional schematic of an adjustable feed stop according to one embodiment of the present invention.

FIG. 3B is an exploded cross-sectional schematic of an adjustable feed stop according to one embodiment of the present invention.

FIG. 3C is a further exploded cross-sectional schematic of an adjustable feed stop according to one embodiment of the present invention.

FIG. 3D is a cross-sectional schematic of an adjustable feed stop according to one embodiment of the present invention taken along line 3D—3D in FIG. 3B.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
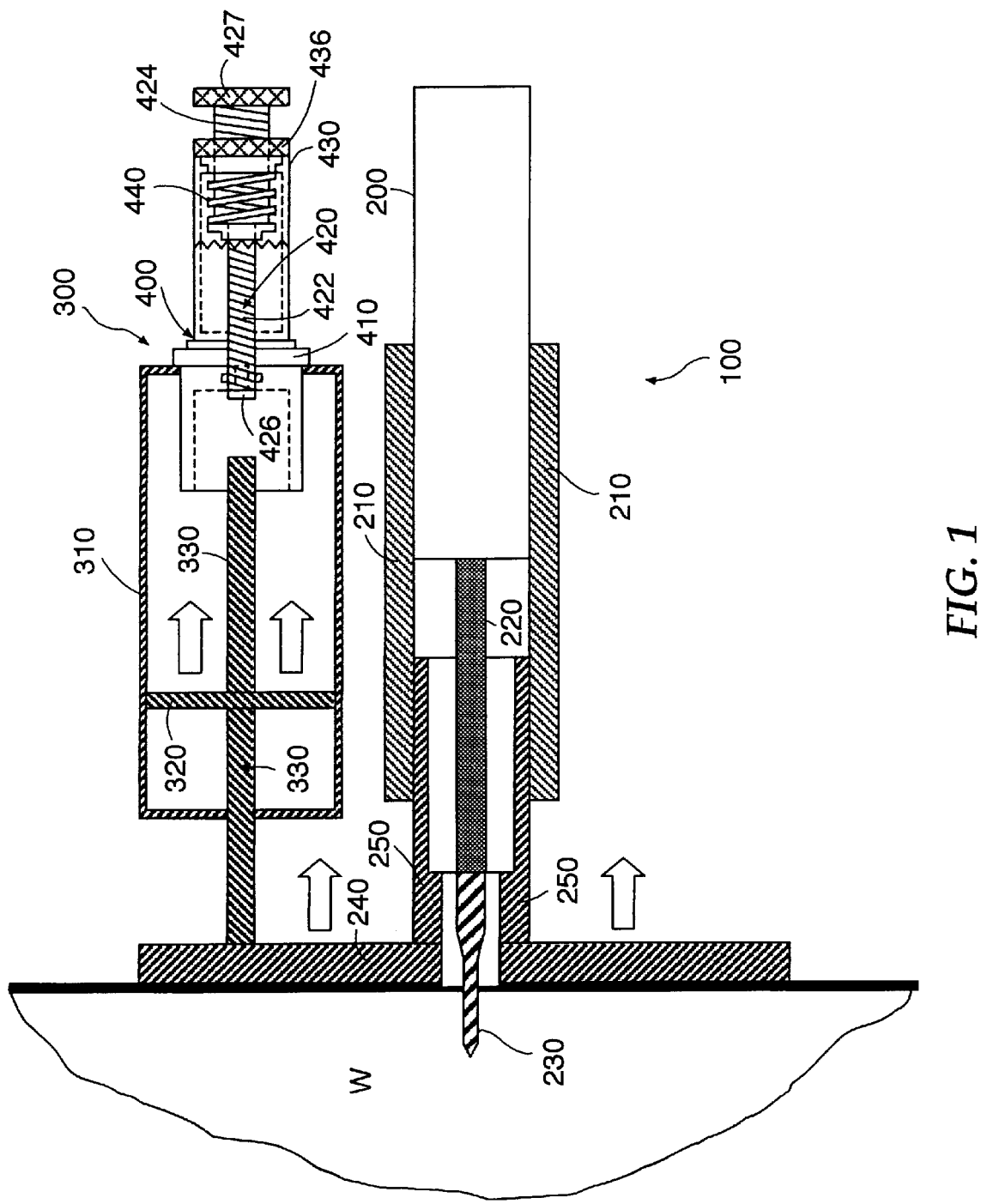
FIG. 1 is a partial cross-sectional schematic of a pneumatic power feed drilling device having an axial feed apparatus with an adjustable feed stop according to one embodiment of the present invention.

FIG. 1 discloses one embodiment of an axial feed drilling apparatus having an adjustable feed stop in accordance with the present invention, the drilling apparatus indicated generally by the numeral 100. The drilling apparatus 100 may be pneumatically powered and generally comprises a drill motor 200 and an axial feed apparatus 300 which cooperate to drill and/or countersink holes in a workpiece W. The drill motor 200 includes a drill housing 210 through which extends a spindle 220 that is rotated by the drill motor 200. Engaging the free end of the spindle 220 is a cutter 230, for example, a drill bit, a countersink bit, or a drill/countersink bit, for producing a hole in the workpiece W. The drilling apparatus 100 is configured such that the cutter 230 extends through a drill plate 240 to interact with the workpiece W. The drill plate 240 interacts with the drill housing 210 via a feed slide 250 which slidably engages the drill housing 210 such that the drill plate 240 may move relative to the drill housing 210. Thus, in order to drill and/or countersink a hole in the workpiece W, the cutter 230 extends from the drill housing 210, through the feed slide 250, and through the drill plate 240. The drill plate 240 typically abuts the surface of the workpiece W in which the countersink is to be formed and may be, for example, arranged perpendicularly to the cutter 230, at an angle with respect thereto, may conform to the contours of the workpiece W, or may include alignment provisions for interacting with the workpiece W to form the countersink in the desired location. Further, in some instances, the drill plate 240 and the feed slide 250 may function as a drill bushing for supporting and guiding the cutter 230 and/or the spindle 220. The drill plate 240 and the feed slide 250 are configured such that, as the drill plate 240 is moved toward the drill housing 210, the cutter 230 protrudes outwardly of the drill plate 240 from the drill housing 210. The distance that the cutter 230 is able to protrude outwardly of the drill plate 240 determines the depth of the countersink in the workpiece W. In one particularly advantageous embodiment, the drill motor 200 may comprise, for example, a Model No. LB524-H045-40 drill motor manufactured by Atlas Copco of Stockholm, Sweden.

Figure 2:
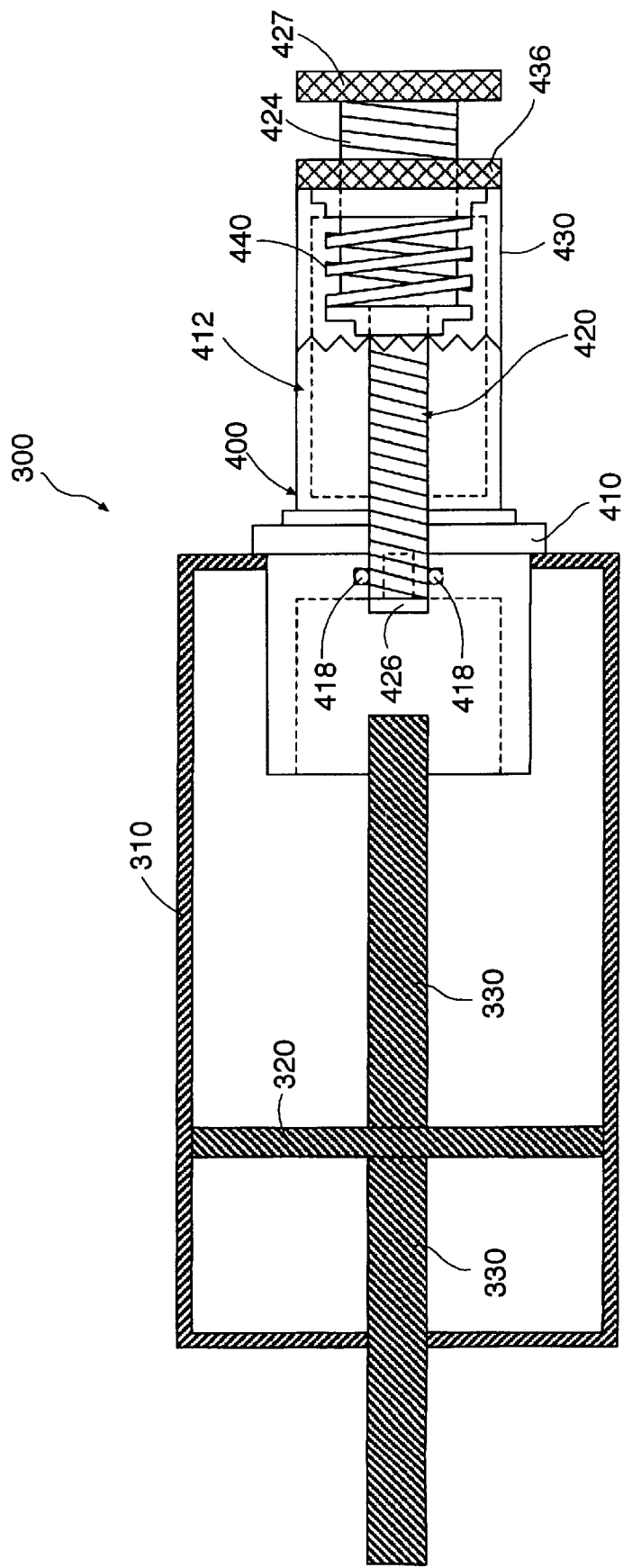
FIG. 2 is a cross-sectional schematic of an axial feed apparatus with an adjustable feed stop according to one embodiment of the present invention.

The feed mechanism 300 is particularly adapted to control the movement of the drill plate 240 with respect to the drill housing 210. As shown in FIGS. 1 and 2, the feed mechanism 300 includes a piston housing 310 that is generally fixed in position with respect to the drill housing 210. Slidably disposed within the piston housing 310 is a feed piston 320. The feed piston 320 further engages a feed rod 330 that extends through the piston housing 310 to engage the drill plate 240. Generally, the feed mechanism 300 is configured such that the feed piston 320 may be, for example, hydraulically or pneumatically urged to slide within the piston housing 310 away from the workpiece W, which thereby draws the drill plate 240 toward the drill housing 210 via the feed rod 330 and provides a power feed for the drilling apparatus 100. In some instances, the feed mechanism 300 may be modularly configured such that, for example, the feed mechanism 300 may be removed and attached to a different drill plate 240/drill motor 200 assembly or the drill housing 210 may be configured to accommodate different drill motors 200. In one particularly advantageous embodiment, the feed mechanism 300 comprises a Doler CD feed control module Model No. CD34-X1P1-D30 manufactured by Cooper Power Tools of Lexington, S.C. The feed mechanism 300 further includes a depth stop mechanism 400. The depth stop mechanism 400 interacts with the piston housing 310 to limit the travel of the feed piston 320 and thereby control the depth to which the cutter 230 extends into the workpiece W. The depth stop mechanism 400 is disposed within the path of motion of the feed piston 320 and/or the feed rod 330 to provide physical impedance to the motion of the feed piston 320 and to positively limit the distance to which the cutter 230 protrudes from the drill plate 240, thereby defining a positive feed limit for the cutter 230.

As shown in FIGS. 1 and 2, and further in FIGS. 3A–3D, a depth stop mechanism 400 according to one particularly advantageous embodiment of the present invention, generally comprises a sleeve 410, a spindle 420, a collar 430, and a mechanical bias device 440. The sleeve 410 engages the piston housing 310 such that the sleeve 410 is coaxially aligned with the feed rod 330. The sleeve 410 has an end 412 extending outwardly of the piston housing 310. In one particularly advantageous embodiment, the outward end 412 is annularly configured and has a series of regular graduations 414 thereabout. The graduations 414 may comprise, for example, serrations, grooves, or the like. The sleeve 410 further defines an orifice 416, wherein the orifice 416 is preferably uniaxially aligned with the feed rod 330.

The spindle 420, in one embodiment, may be configured to have a first threaded portion 422 and a second threaded portion 424, wherein the threaded portions 422 and 424 differ in diameter. In some instances, the orifice 416 is threaded so as to be capable of threadedly engaging the first threaded portion 422 of the spindle 420. The sleeve 410 may further be configured to accommodate a seal member 418 such as, for example, an o-ring, that is disposed about the orifice 416 to form a seal with the first threaded portion 422 of the spindle 420. In some instances, the first threaded portion 422 may further comprise a stop plug 426, wherein the stop plug 426 extends through the orifice 416 and into the piston housing 310 for engaging the feed member 330. Accordingly, rotation of the first threaded portion 422 with respect to the threaded orifice 416 moves the stop plug 426 by an axial distance corresponding to the direction of the rotation of the spindle 420 and the pitch of the engaging threads.

The second threaded portion 424 of the spindle 420 differs in diameter from the first threaded portion 422 such that a shoulder 425 is formed therebetween. The spindle 420 may further comprise a turning knob 427 operably connected to the end of the second threaded portion 424 opposite the shoulder 425. Rotation of the turning knob 427 rotates both the first threaded portion 422 and the second threaded portion 424. The first threaded portion 422 thus rotates with respect to the threaded orifice 416 and moves the stop plug 426 in an axial direction. The stop plug 426 therefore provides an adjustable positive stop for the feed rod 330. Since the piston housing 310 is fixed in position with respect to the drill housing 210, and since both the feed slide 250 and the feed rod 330 are affixed to the drill plate 240, the stop plug 426 provides a positive stop for the feed rod 330. The feed of the cutter 230 into the workpiece W can thereby be controlled to provide a more consistent and repeatable drilling/countersinking depth such that the process may be performed in one pass of the cutter 230 into the workpiece W.

Another advantageous aspect of the present invention facilitates axial adjustment of the stop plug 426 in the axial direction, locks the stop plug 426 at a desired axial position, and provides precise and easily executed adjustments in the axial position of the spindle 420 with respect to the threaded orifice 416. The depth stop device 400 may further comprise a collar 430 surrounding the spindle 420 and which, in some instances, is configured to surround the second threaded portion 424. In one particularly advantageous embodiment, the collar 430 is annularly configured and includes a series of regular graduations 432 about the end of the collar 430 facing the sleeve 410. Preferably, the collar graduations 432 correspond to, and are engageable with, the sleeve graduations 414. Generally, the collar 430 is capable of axial movement with respect to the second threaded portion 424, but is rotationally fixed with respect thereto. As shown in FIG. 3D, the second threaded portion 424 may include, for example, an axial key way 423 which is configured to engage a key 434 extending through a wall of the collar 430. The axial key way 423 thus allows the key 434 to slide therealong, while the key 434 engages the collar 430 and prevents the collar 430 from rotating with respect to the second threaded portion 424.

In some instances, a mechanical bias device 440 such as, for example, a coil spring, is operably connected between the spindle 420 and the collar 430 for biasing the collar graduations 432 toward the sleeve graduations 414. In situations where the collar graduations 432 are engaged with the sleeve graduations 414, the spindle 420 is prevented from rotating since the collar 430 is rotationally fixed with respect to the second threaded portion 424. However, if an axial force is exerted on the collar 430 away from the sleeve 410 such that the collar graduations 432 are disengaged from the sleeve graduations 414, a rotational force exerted on the collar 430 will then, in turn, rotate the first threaded portion 422 with respect to the threaded orifice 416. If the collar 430 is then released, the respective graduations 432 and 414 are urged into reengagement by the mechanical bias device 440 and the first threaded portion 422 is locked in a corresponding axial position. In a particularly advantageous embodiment of the present invention, the respective graduations 432 and 414 are configured such that a change in engagement of the graduations causes the spindle 420 to move by a corresponding axial distance. For example, where the graduations 432 and 414 comprise regular serrations, a change in the engagement of the serrations by one tooth may correspond to a change in the axial position of the stop plug 426 of no more than 0.001 inches. In order to assure that the graduations remain engaged during the drilling/countersinking process, and between successive processes, the depth stop mechanism 400 may further include a jam nut 436 threadedly engaged with the second threaded portion 424 intermediate the collar 430 and the turning knob 427. The jam nut 436 is configured such that it may be brought into engagement with the end of the collar 430 opposite the graduations 432 to prevent the graduations 432 and 414 from disengaging due to an axial force exerted on the collar 430 away from the sleeve 410.

Figure 4A:
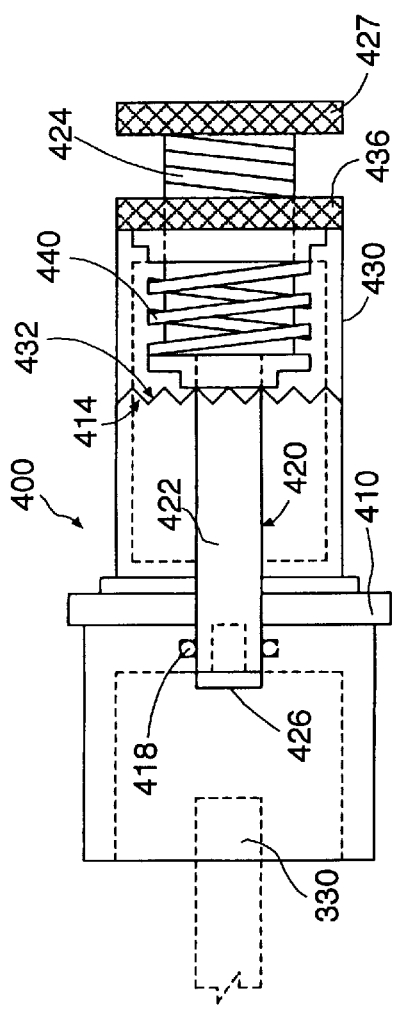
FIGS. 4A, 4B and 4C illustrate a method of controlling the axial feed of a drilling apparatus according to one embodiment of the present invention.
Figure 4B:
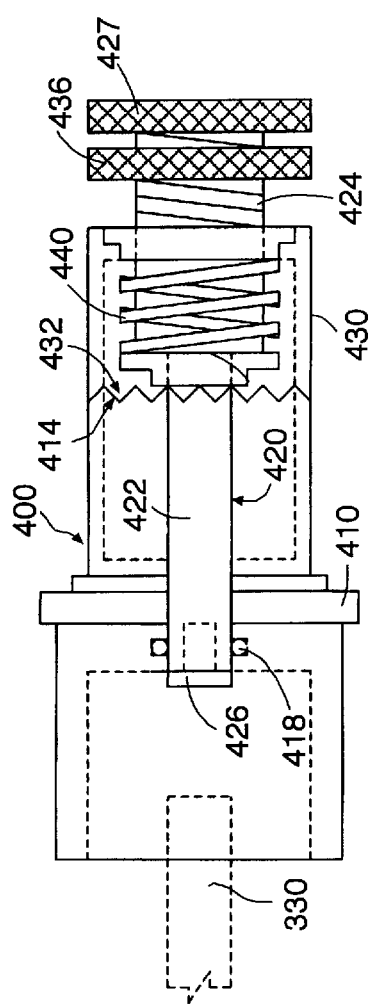
Figure 4C:
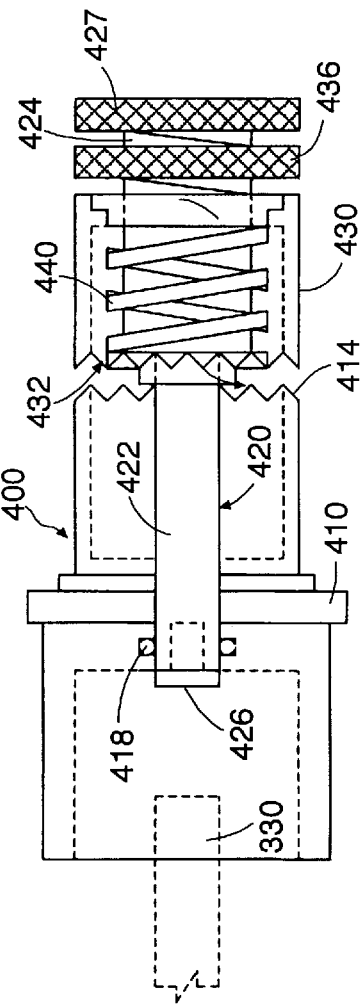

The method of adjusting the depth stop mechanism 400 is further shown in FIGS. 4A–4C. FIG. 4A shows the collar graduations 432 engaged with the sleeve graduations 414, with the jam nut 436 securing the collar 430 such that the collar 430 is not capable of axial movement with respect to the second threaded portion 424 in a direction away from the sleeve 410. Thus, the spindle 420 is not capable of rotating with respect to the sleeve 410 and the stop plug 426 is maintained in a fixed axial position to provide a positive stop for the feed rod 330. As shown in FIG. 4B, in order to adjust the axial position of the stop plug 426, the jam nut 436 must be disengaged from the collar 430 by rotating the jam nut 436 such that it moves axially in the direction of the turning knob 427. As shown in FIG. 4C, an axial force may then be exerted on the collar 430 away from the sleeve 410 so as to separate the collar graduations 432 from the sleeve graduations 414. The spindle 420 may then be rotated with respect to the sleeve 410 by rotating the collar 430 or the turning knob 427. Rotation of the spindle 420 moves the stop plug 426 in the axial direction either toward or away from the feed rod 330. As previously described, the graduations 432 and 414 may be configured such that the precise axial distance by which the stop plug 426 is moved can be determined by counting the change in the engagement of the graduations 432 and 414. For example, changing the engagement of the graduations 432 and 414 by rotating the collar 430 by three teeth may result in an axial movement of 0.003 inches since each tooth may be calibrated to correspond to a change of 0.001 inches in the axial position of the stop plug 426. When the collar 430 is released, the mechanical bias device 440 urges the collar 430 back toward the sleeve 410, thereby causing the graduations 432 and 414 to reengage. The spindle 420 thereby becomes fixed in the desired position and the jam nut 436 can then be brought back into engagement with the collar 430 so as to secure the engagement of the graduations 432 and 414 and to maintain the axial position of the stop plug 426.

Thus, embodiments of the present invention provide a device for readily and precisely adjusting the position of a feed stop for a power feed module. Since the power feed module is portable in some instances, the power feed module may be combined with a variety of drill motors and may be quickly and easily adjusted to provide a consistent drilling/countersinking depth. The device therefore provides consistent, accurate and repeatable countersinks, even where the cutter or the drill motor must be changed. The configuration of a drilling apparatus using such a power feed module, according to some embodiments of the present invention, further provides a positive interaction between the cutter and the feed stop such that the depth of the cutter into the workpiece is accurately and positively controlled. In addition, the feed stop mechanism promotes ready adjustment of the position of the feed stop to adjust the countersink depth without requiring an excessive or complicated adjustment process. Therefore, the axial feed apparatus having an adjustable feed stop according to embodiments of the present invention provides a more readily adjustable feed stop that is capable of being used with a variety of cutters and/or drill motors to obtain a more consistent, accurate, and repeatable drilling/countersinking depth than prior art drilling/countersinking mechanisms.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An axial feed apparatus having an adjustable feed stop, comprising:

a hydraulically-actuated device having a feed member slidably disposed within a housing;

a sleeve having a first end engaging the housing and a second end extending outwardly of the housing, the second end defining a series of graduations thereabout;

a spindle having a feed stop extending into the housing through the sleeve such that the feed stop is capable of engaging the feed member and providing a feed limit; and a collar surrounding the spindle outwardly of the housing, the collar being rotationally fixed with respect to the spindle and defining a series of graduations thereabout corresponding to and engagable with the sleeve graduations, the spindle thereby being prevented from rotating when the collar graduations engage the sleeve graduations, the collar further slidably engaging the spindle to allow disengagement of the graduations and rotation of the spindle, the graduations and the spindle being configured such that a rotational change of the collar graduations with respect to the sleeve graduations moves the feed stop by a corresponding axial distance.

2. An apparatus according to claim 1 wherein the hydraulically-actuated device comprises a pneumatic drill motor having a power feed module.

3. An apparatus according to claim 1 wherein the hydraulically-actuated device comprises a hydraulic power feed module.

4. An apparatus according to claim 1 further comprising a mechanical bias member operably connected between the spindle and the collar to bias the collar graduations toward the sleeve graduations.

5. An apparatus according to claim 4 wherein the mechanical bias member comprises a coil spring disposed between the spindle and the collar.

6. An apparatus according to claim 1 wherein the sleeve and the spindle are threadedly engaged.

7. An apparatus according to claim 1 wherein the graduations and the spindle are configured such that a rotational change of the collar graduations with respect to the sleeve graduations corresponds to an axial movement of the feed stop of no more than 0.001 inches/graduation.

8. An apparatus according to claim 1 further comprising a jam nut engaging the spindle and configured to selectively retain the collar graduations in engagement with the sleeve graduations.

9. An apparatus according to claim 1 further comprising a sealing member configured to provide a seal between the spindle and the housing.

10. An apparatus according to claim 9 wherein the sealing member comprises an o-ring disposed about the orifice and configured to sealingly engage the spindle.

11. An apparatus according to claim 1 wherein the spindle is uniaxially disposed with respect to the feed member.

12. An axial feed drilling apparatus having an adjustable feed stop, comprising:

a drill motor adapted to rotate a cutter; and an axial feed device having a feed member adapted to feed the cutter, the feed member being movable toward a feed stop disposed uniaxially with respect to the feed member, the axial feed device also having first and second members with respective graduations that are capable of interacting such that a change in engagement between the interacting first and second graduated members moves the feed stop by a predetermined axial distance, the axial feed device thereby providing an adjustable feed limit where the feed member engages the feed stop.

13. An apparatus according to claim 12 further comprising a retraction mechanism for retracting the feed member from the feed limit.

14. An apparatus according to claim 12 wherein the axial feed device is hydraulically-actuated and further comprises:
   a housing having the feed member slidably disposed therein;
   a sleeve comprising the first graduated member and having a first end engaging the housing and a second end extending outwardly of the housing, the second end defining a series of graduations thereabout;
   a spindle threadedly engaging the sleeve and having an end comprising the feed stop, the feed stop extending into the housing such that the feed stop is capable of engaging the feed member; and
   a collar comprising the second graduated member and surrounding the spindle outwardly of the housing, the collar being rotationally fixed with respect to the spindle and defining a series of graduations thereabout corresponding to and engagable with the sleeve graduations, the spindle thereby being prevented from rotating when the collar graduations engage the sleeve graduations, the collar further slidably engaging the spindle to allow disengagement of the graduations and rotation of the spindle, the graduations and the spindle being configured such that a rotational change of the collar graduations with respect to the sleeve graduations moves the feed stop by a corresponding axial distance.

15. An apparatus according to claim 14 further comprising a mechanical bias member operably connected between the spindle and the collar to bias the collar graduations toward the sleeve graduations.

16. An apparatus according to claim 15 wherein the mechanical bias member comprises a coil spring disposed between the spindle and the collar.

17. An apparatus according to claim 14 wherein the graduations and the spindle are configured such that a rotational change of the collar graduations with respect to the sleeve graduations corresponds to an axial movement of the feed stop of no more than 0.001 inches/graduation.

18. An apparatus according to claim 14 further comprising a jam nut engaging the spindle and configured to selectively retain the collar graduations in engagement with the sleeve graduations.

19. An axial feed drilling apparatus having an adjustable feed stop, comprising:
   a pneumatic drill motor adapted to rotate a cutter;
   a power feed module with a movable feed member adapted to feed the cutter; and
   a stop device disposed uniaxially with respect to the feed member and having a feed stop, the stop device also having first and second members with respective graduations that are capable of interacting such that a change in engagement between the interacting first and second graduated members moves the feed stop by a predetermined axial distance, the stop device thereby providing an adjustable feed limit where the feed member engages the feed stop.

20. An apparatus according to claim 19 wherein the stop device further comprises:
   a sleeve comprising the first graduated member and having an end defining a series of graduations thereabout, the sleeve configured to threadedly engage the feed stop; and
   a collar comprising the second graduated member and surrounding the feed stop outwardly of the sleeve, the collar being rotationally fixed with respect to the feed stop and defining a series of graduations thereabout corresponding to and engagable with the sleeve graduations, the feed stop thereby being prevented from rotating when the collar graduations engage the sleeve graduations, the collar further slidably engaging the feed stop to allow disengagement of the graduations and rotation of the feed stop, the graduations and the feed stop being configured such that a rotational change of the collar graduations with respect to the sleeve graduations moves the feed stop by a corresponding axial distance.

21. An apparatus according to claim 20 further comprising a mechanical bias member operably connected between the feed stop and the collar to bias the collar graduations toward the sleeve graduations.

22. An apparatus according to claim 21 wherein the mechanical bias member comprises a coil spring disposed between the feed stop and the collar.

23. An apparatus according to claim 21 wherein the graduations and the feed stop are configured such that a rotational change of the collar graduations with respect to the sleeve graduations corresponds to an axial movement of the feed stop of no more than 0.001 inches/graduation.

24. An apparatus according to claim 21 further comprising a jam nut engaging the feed stop and configured to selectively retain the collar graduations in engagement with the sleeve graduations.

25. A method of controlling the axial feed of a drilling apparatus comprising:
   engaging a drill motor with a feed member of an axial feed device, the drill motor being adapted to rotate a cutter;
   adjusting a feed stop on the axial feed device, the axial feed device comprising first and second members with respective graduations that are capable of interacting, said adjusting further comprising changing the engagement of the graduations of the first and second members to move the feed stop axially by a predetermined amount; and
   moving the feed member into engagement with the feed stop to thereby feed the cutter to an adjustable feed limit.

26. A method according to claim 25 wherein adjusting the feed stop further comprises moving one member with respect to the other to provide an axial movement of the feed stop of no more than 0.001 inches/graduation.

27. A method according to claim 25 further comprising locking the feed stop by preventing disengagement of the first and second members following adjusting the feed stop.

28. A method according to claim 27 wherein locking the feed stop further comprises biasing one member toward the other with a mechanical biasing device.

29. A method according to claim 25 wherein adjusting the feed stop further comprises:
   moving one member axially with respect to the other member to disengage the respective graduations;
   rotating one member with respect to the other to axially move the feed stop; and
   re-engaging the respective graduations to secure the feed stop at a predetermined position.

* * * * *